May 9, 1961     T. L. BARTHOLOMEW ET AL     2,983,053
EDUCATION MACHINE OF THE QUESTION AND HIDDEN ANSWER VARIETY
Filed May 20, 1957     3 Sheets-Sheet 1
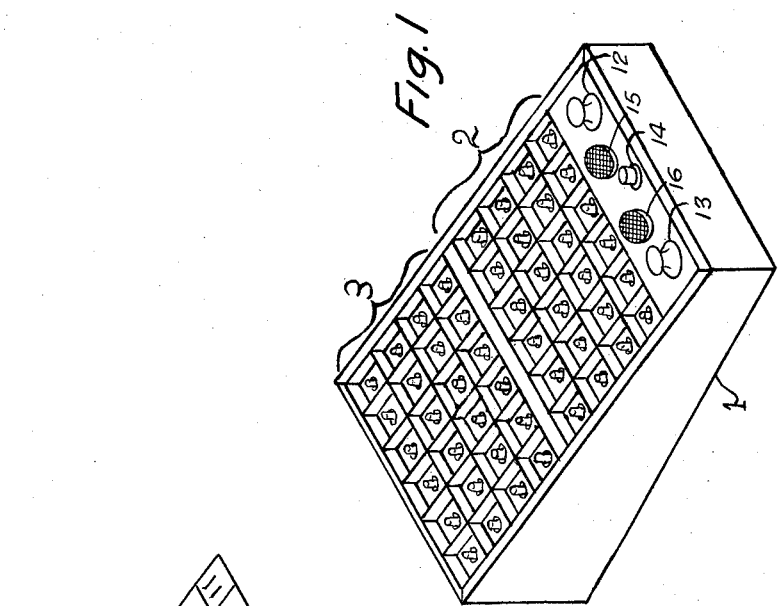
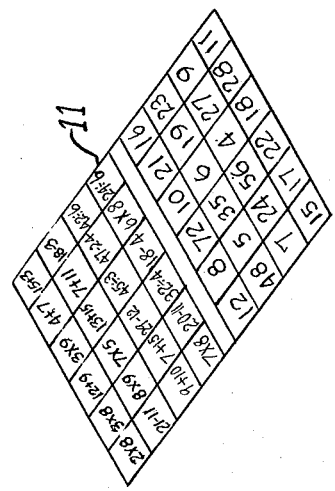
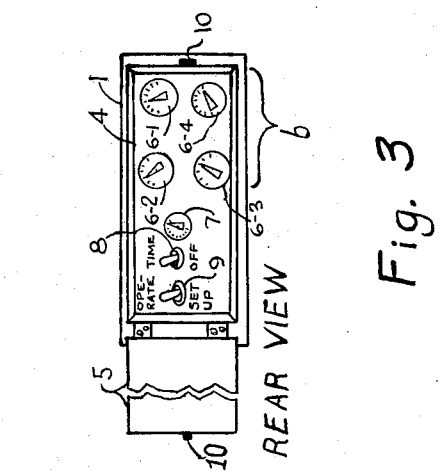
INVENTOR.
BY
Carl S. Kuhn
Thomas L. Bartholomew

United States Patent Office 2,983,053
Patented May 9, 1961

2,983,053
EDUCATION MACHINE OF THE QUESTION AND HIDDEN ANSWER VARIETY

Thomas L. Bartholomew, 1720 Newton St. NW., Washington, D.C., and Carl S. Kuhn, 1604 Pumphrey St., Baltimore, Md.

Filed May 20, 1957, Ser. No. 660,354

5 Claims. (Cl. 35—9)

This invention is for the purpose of creating and holding human interest in the teaching of a given subject. While numerous machines have been devised along this line and have outward appearances of being similar, none have the large variety of combinations and the enticing method of presenting the answers, thus creating a psychological effect that will hold human interest to a given subject for considerably longer periods of time than the person would normally devote to the subject.

Other important objects and advantages of the invention will best be understood from the following detailed description, constituting a specification of the same, when considered in conjunction with the annexed drawings, wherein:

Fig. 1 is a perspective view showing the cabinet housing the lights, wiring, switches, and other mechanism necessary for operating the machine.

Fig. 2 is a perspective view of the translucent panel, containing the groups of questions and answers, to be placed over the lights shown in Fig. 1.

Fig. 3 is a rear view of the inside of the cabinet showing the switches and other components accessible only to the authorized person in charge of the machine by means of the door 5 and lock 10.

Figure 4A:
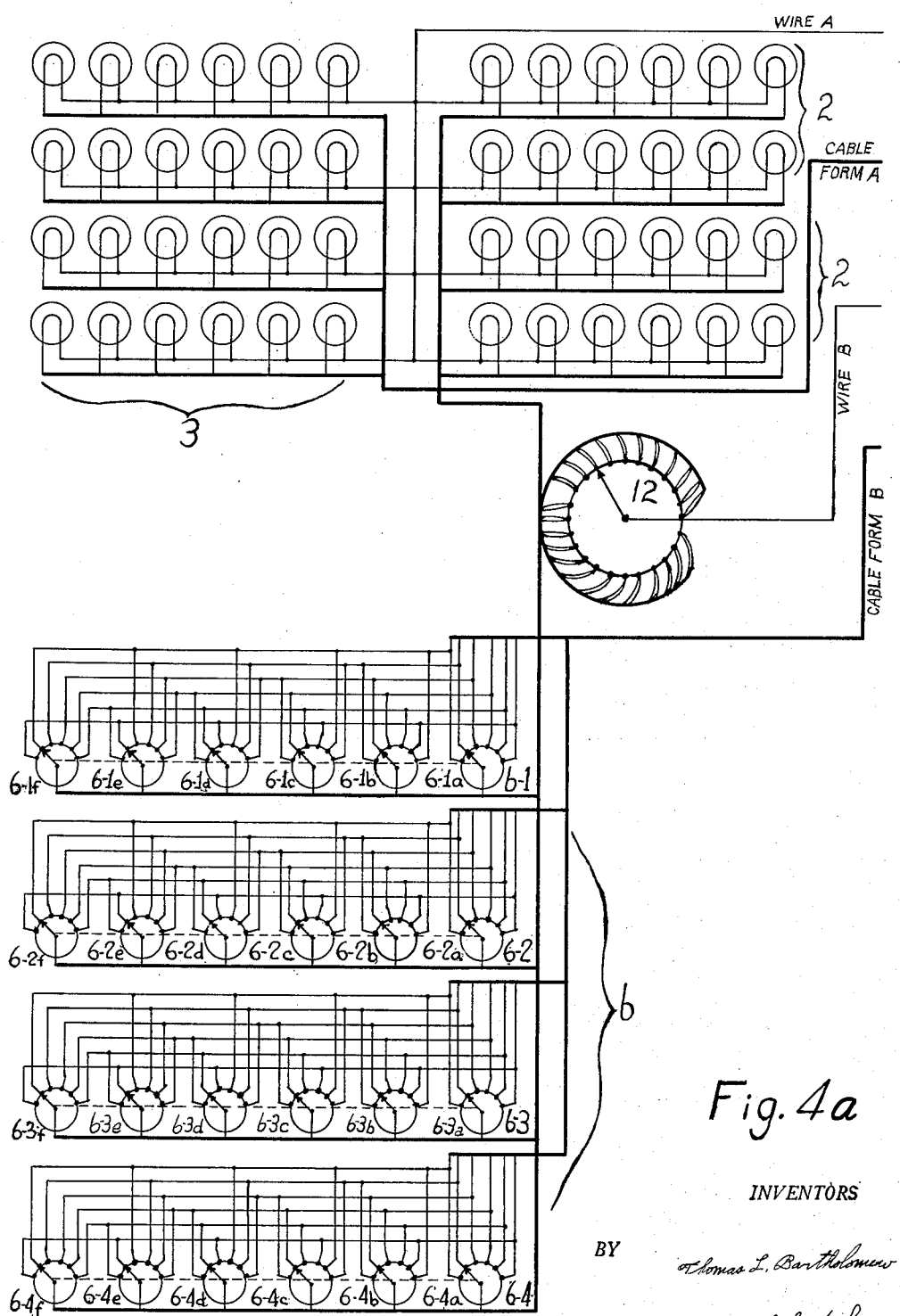
Fig. 4a is a circuit diagram for the lights and interchange switches.

To describe the machine in detail: The cabinet 1 supports and houses the entire mechanism. There is one group of lights 3 that are under the questions, and another group of lights 2 that are under the answers. The questions and answers are put on a type of material 11 that will transmit light, so that the particular question or answer will become outstanding when a light is lit behind it. Sheet 11 is shown with mathematical problems. This is purely illustrative as any subject can be used. The lights 3, under the questions are controlled by switch 13a. Switch 13a is connected in such a manner that the lights 3 will light in sequence in relation to the rotation of switch 13a. The lights 2 under the answer group, are connected to switch 12. These lights 2 are connected in such a manner that they will light in sequence in relation to the rotation of switch 12. The voltage supply 26 will be derived by connection to a suitable extraneous alternating current source.

Figure 4B:
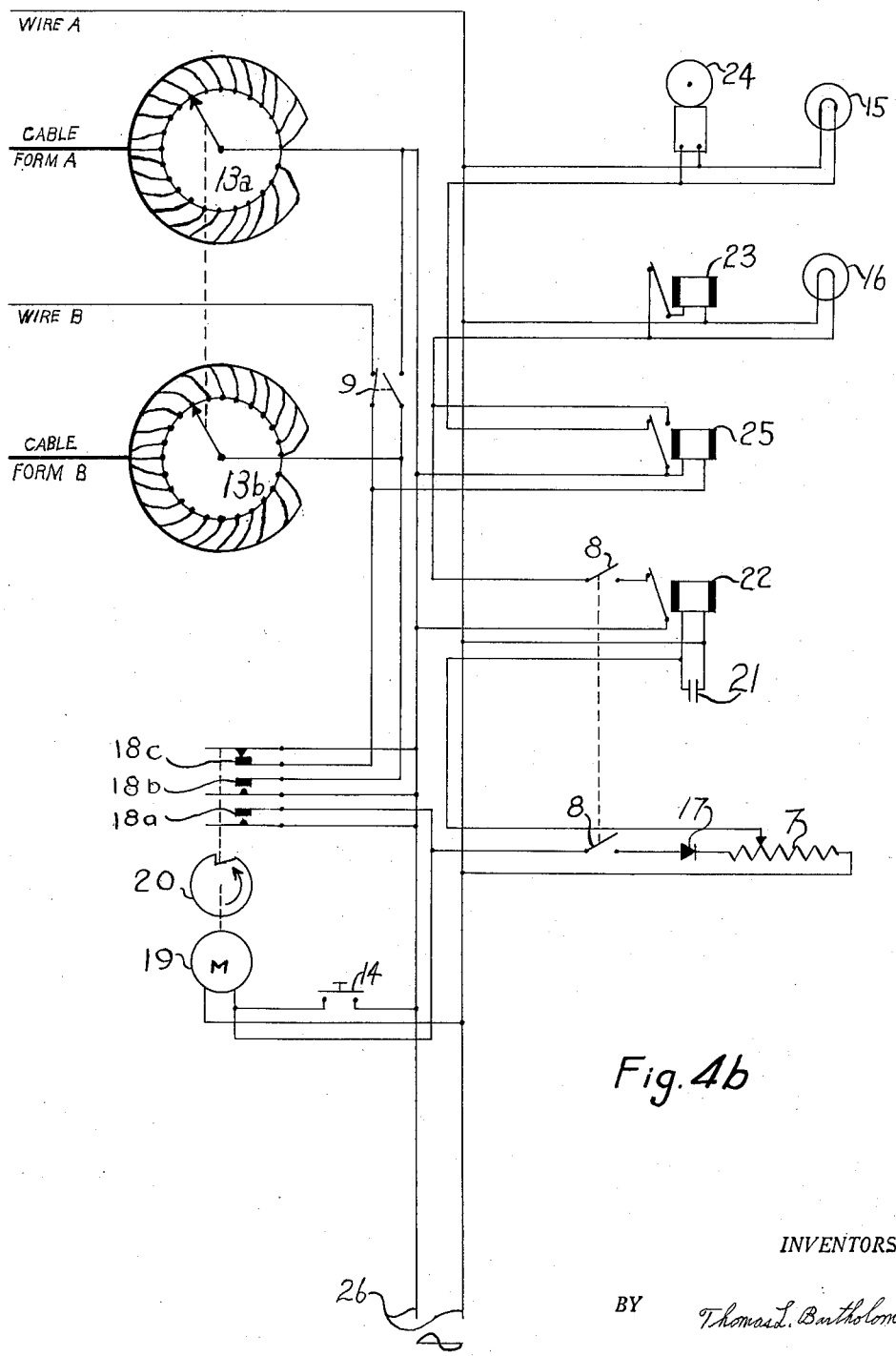
Fig. 4b is a circuit diagram for the bell, buzzer, red and green lights, potentiometer, motor and switches.

The interchange switches are shown in Fig. 4b of the drawing and are designated 6-1, 6-2, 6-3 and 6-4.

The wires from the center contacts of the interchange switches 6 are connected in rotation, starting from 6-1a which connects to a marked terminal on switch 12. Center contact of switch 6-1b connects to the contact to the left of the marked terminal on switch 12. The process is repeated till all the center contacts of interchange switches are connected consecutively to switch 12 contacts. The wires from the answer lights 2 connect to the same terminals on switch 12 as do the center contact wires from the interchange switches 6. Wires are connected at random, one on each terminal, to switch 13b and from there go to the stationary contacts of the interchange switches 6. At the interchange switches 6 a wire is taken that is connected to a marked terminal of switch 13b and put on a marked stationary contact of the first deck or gang 6-1a. The wire is then also connected to the next switch deck 6-1b. The wire is not connected to the contact directly beneath the one that it was connected to in deck 6-1a, but to the contact to the left. The wire continues on, stopping on the last deck 6-1f, and as it goes from one deck to another it is connected one contact to the left of the preceding deck. Another is chosen to the left of the marked wire on switch 13b and is connected to the left of the contact adjoining the one that the first wire was put on at deck 6-1a and then is carried on to the other decks in line as previously described. This method is continued till six wires have been installed—thus giving a wire on every contact of switch 6-1. The seventh wire to the left of the marked terminal from switch 13b is chosen and connected to a marked contact on switch 6-2a. The same process is then repeated for switch 6-2 as was used for switch 6-1 and the process is then again repeated till all the interchange switches 6 are connected. This exact method of connecting the interchange switches is not important, but is one of the many ways that could be used to achieve good variation in cross-connecting the wires. The marking of the terminals and having a routine for wiring them is so that sheet 11 will interchange from one machine to another. The purpose of the interchange switches 6 is to prevent the operator from memorizing the location of the answer lights 2 in relation to the question lights 3.

To "set up" the machine: Switch 9 is moved to the "set up" position which closes the circuit to switch 13b and opens the circuit to switch 12. Switches 6-1, 6-2, 6-3 and 6-4 of the interchange group are each set on some position from one to six. The position of each switch is noted on the sheet 11 that is to cover the lights so that when this particular subject is to be used again it is just a matter of setting the interchange switches to the position shown on the sheet 11 and the lights will indicate correctly between the questions and answers. With the machine set as mentioned, the position of the question and answer lights may be determined by the rotation of switch 13. By placing the question and answers on the squares that the lights indicate the sheet 11 will be ready to use.

To operate the machine: Switch 9 is moved to the "operate" position, the interchange switches are set as shown by the numbers on the sheet to be used. For now switch 8 can be in the off position. Switch 12 is operated by one hand and switch 13 by the other hand. When the operator has moved switch 13 to indicate the desired question, he will then move switch 12 to indicate what he assumes to be the right answer. When he has made the selection he presses the cycle button 14 briefly, which will cause motor 19 to rotate. Motor 19 drives cam 20 and when the cam moves it will actuate contacts 18. As soon as contact 18a is closed the motor will continue to run for one revolution of the cam since contact 18a shunts out cycle button 14. The motor is connected to the cam by gears that will cause the cam to revolve once in about four seconds of time. If the operator has selected the right answer and upon pressing cycle button 14; contact 18c will open at the start of the cam travel and remove the voltage from the rotating contact of switch 12, the same light in the answer group will remain lit since the voltage is now being supplied through contact 18b, switch 13b and the interchange switches 6. Also at the time carbon button 14 is pressed, if the answer is correct, bell 24 will sound and green light 15 will light, indicating the answer is correct. If the operator has selected the wrong answer; when cycle button 14 is pressed contact 18a will close to maintain the rotation of the cam for one revolution, contact 18c will open and switch 12 will receive current through relay 25. The current passing through relay 25 will actuate its movable contact and close the circuit to buzzer 23 and red light 16. The voltage drop across relay 25 will cause the light under the wrong answer, connected by switch 12, to become dim. When contact 18b closes it will supply current to switch 13b, which is always set on the correct answer, from switch 13b the current goes to the interchange switches 6, through the interchange switches to the terminals of switch 12 where the answer lights are connected and causing the correct answer to light to full brilliancy. All contacts 18 are actuated simultaneously. To generalize the aforesaid: When the correct answer is selected and the cycle button pressed, the question and answer lights will remain as they are, a bell will sound and the green light will light for the period of one revolution of the cam. When the wrong answer is selected and the cycle button pressed, the question light will remain as is, the wrong answer that was selected will become dimly lit and the right answer will come on brightly lit, the buzzer will sound and the red light will light for the duration of one revolution of the cam.

Components 7, 8, 21, 22 and 17 comprise a time delay arrangement that may be used if desired. The purpose of this circuit is to prevent the operator from taking too much time in making his selection of an answer. By closing switch 8 the circuit is in operation. When cycle button 14 is pressed, current is supplied to the motor and to rectifier 17. Rectifier 17 converts the alternating current to direct current. The direct current is necessary in creating the time delaying action of components 21 and 22. The potentiometer 7 is adjusted to supply a voltage to components 21 and 22 to create the time delay desired. Voltage from rectifier 17 passes to potentiometer 7 which energizes condenser 21 and relay 22, causing relay 22 contacts to open. After motor 19 has stopped, the contacts on relay 22 will remain open till the charge on condenser 21 has reduced to such a value that the spring action of the movable contact of relay 22 will cause the contact to close. When the contact closes on relay 22, buzzer 23 will sound and red light 16 will light indicating the operator has taken too much time in his decision.

The transparent sheet 11 (with the question and answer lights directly beneath) and lights 15 and 16 are visible on the top surface of the machine to the operator. Switch 12 (answer lights) and switch 13 (question lights) and cycle button 14 extend through the top surface of the machine for the convenient manipulation by the operator. All other components are mounted beneath the surface of the machine and out of sight. The interchange switches 6, set up switch 9, time delay switch 8 and time delay potentiometer 7 extend through an enclosed panel in the rear of the machine accessible only to the authorized person in charge of the machine by the means of door 5 and lock 10.

Experience has shown that this machine is most beneficial in the training of small groups, and through group competitive operation it will teach a given subject in a shorter time than other training methods now known.

While we have described our invention in detail it is understood that many variations both mechanical and electrical could be induced without departing from the scope of the invention. Having thus described our invention we make the following claims as to what is new and different:

1. A question and hidden answer machine which comprises a translucent panel having a group of visible questions and a group of visible answers thereon, groups of electric lights under said groups of visible questions and answers, electric selective switches controlling said question and answer lights, a cycle button to cause the machine to cycle, and electric circuits between said switches and lights and said cycle button so arranged that when the operator has selected an answer, said cycle button may be actuated by the operator which will cause the machine to cycle and show the correct answer for a brief period of time and return the machine to its original indications after the brief period of time has expired.

2. A question and hidden answer machine which comprises groups of question and answer electric lights, electric switches selectively controlling said question and answer electric lights, a green light and a bell, a red light and a buzzer; switches for said green light and bell, and said red light and buzzer, a cycle button to cause the machine to cycle, and electric circuits between said selective electric switches, said cycle button, and said lights, so arranged that if the answer is correct said green light will light and said bell will ring, and if the answer is incorrect the wrong answer will appear dimly lit, the right answer will be brightly lit, and said red light will light and said buzzer will sound.

3. A question and hidden answer machine comprising groups of question and answer lights, electric switches each selectively controlling said question and answer lights, a red light and a buzzer, a cycle button causing the machine to cycle, and electric circuits between said switches and lights and said cycle button and buzzer, so arranged that when said cycle button is pressed and the operator has taken too much time in selecting an answer, the machine will indicate that too much time has been taken by the appearance of said red light and the sound of said buzzer.

4. A question and hidden answer machine which comprises a translucent panel having a group of visible questions and a group of visible answers thereon, groups of electric lights under said groups of visible questions and answers, electric selective switches controlling the said question and answer lights, a cycle button, motor, cam and switches to cause the machine to cycle, and electric circuits between said switches and lights and said cycle button, motor, cam and switches, so arranged that when the operator has selected an answer, said cycle button may be actuated by the operator which will cause the machine to cycle and show the correct answer for a brief period of time and return the machine to its original indications after the brief period of time has expired.

5. A question and hidden answer machine comprising groups of question and answer lights, electric switches which selectively control the said question and answer lights, a red light and a buzzer, a cycle button causing the machine to cycle, a motor, a cam geared to and actuated by the motor, switches actuated by the cam, and electric circuits between said switches and lights and said cycle button and buzzer, so arranged that when said cycle button is pressed and the operator has taken too much time in selecting an answer, the machine will indicate that too much time has been taken by the appearance of said red light and the sound of said buzzer.

References Cited in the file of this patent

UNITED STATES PATENTS

| | | |
|---|---|---|
| 450,615 | Delany | Apr. 21, 1891 |
| 1,647,276 | Daman | Nov. 1, 1927 |
| 1,932,994 | Tucker | Oct. 31, 1933 |
| 2,148,259 | Cisin | Feb. 21, 1939 |
| 2,149,459 | Morehouse | Mar. 7, 1939 |
| 2,275,988 | Parker | Mar. 10, 1942 |
| 2,498,578 | Reinnagel | Feb. 21, 1950 |
| 2,545,381 | Prentice | Mar. 13, 1951 |
| 2,546,543 | Jones | Mar. 27, 1951 |
| 2,591,327 | Witter et al. | Apr. 1, 1952 |
| 2,656,618 | Pescatori | Oct. 27, 1953 |
| 2,690,621 | Dean | Oct. 5, 1954 |
| 2,697,882 | Gruot | Dec. 28, 1954 |
| 2,835,052 | Raich | May 20, 1958 |
| 2,877,568 | Besnard | Mar. 17, 1959 |

FOREIGN PATENTS

| | | |
|---|---|---|
| 381,787 | Germany | Sept. 24, 1923 |